(12) United States Patent
Harmsen

(10) Patent No.: US 8,202,484 B2
(45) Date of Patent: Jun. 19, 2012

(54) COMBINED EXHAUST GAS AFTERTREATMENT DEVICE

(75) Inventor: Jan Harmsen, Simpelveld (NL)

(73) Assignee: Ford Global Technologies, LLC, Dearborn, MI (US)

(*) Notice: Subject to any disclaimer, the term of this patent is extended or adjusted under 35 U.S.C. 154(b) by 379 days.

(21) Appl. No.: 12/553,363

(22) Filed: Sep. 3, 2009

(65) Prior Publication Data

US 2010/0092349 A1 Apr. 15, 2010

(30) Foreign Application Priority Data

Oct. 13, 2008 (DE) .................. 10 2008 042 766

(51) Int. Cl.
*B01D 50/00* (2006.01)
(52) U.S. Cl. ........................ 422/177; 422/180
(58) Field of Classification Search .................. 422/177, 422/180
See application file for complete search history.

(56) References Cited

U.S. PATENT DOCUMENTS

| 2006/0153748 A1* | 7/2006 | Huthwohl et al. ............ 422/172 |
| 2008/0127635 A1 | 6/2008 | Hirata et al. |

FOREIGN PATENT DOCUMENTS

| DE | 602 22 826 | 7/2008 |
| WO | 2006/021337 | 3/2006 |
| WO | 2006/021338 | 3/2006 |

* cited by examiner

*Primary Examiner* — Tom Duong
(74) *Attorney, Agent, or Firm* — Allan J. Lippa; Alleman Hall McCoy Russell & Tuttle LLP

(57) ABSTRACT

The description relates to an exhaust gas purification system for exhaust gases that are emitted from an internal combustion engine, in particular a diesel engine. In one embodiment, exhaust gases from the engine are separated into two streams. The two exhaust streams are processed differently so as to take advantage of different attributes of different aftertreatment devices.

10 Claims, 2 Drawing Sheets

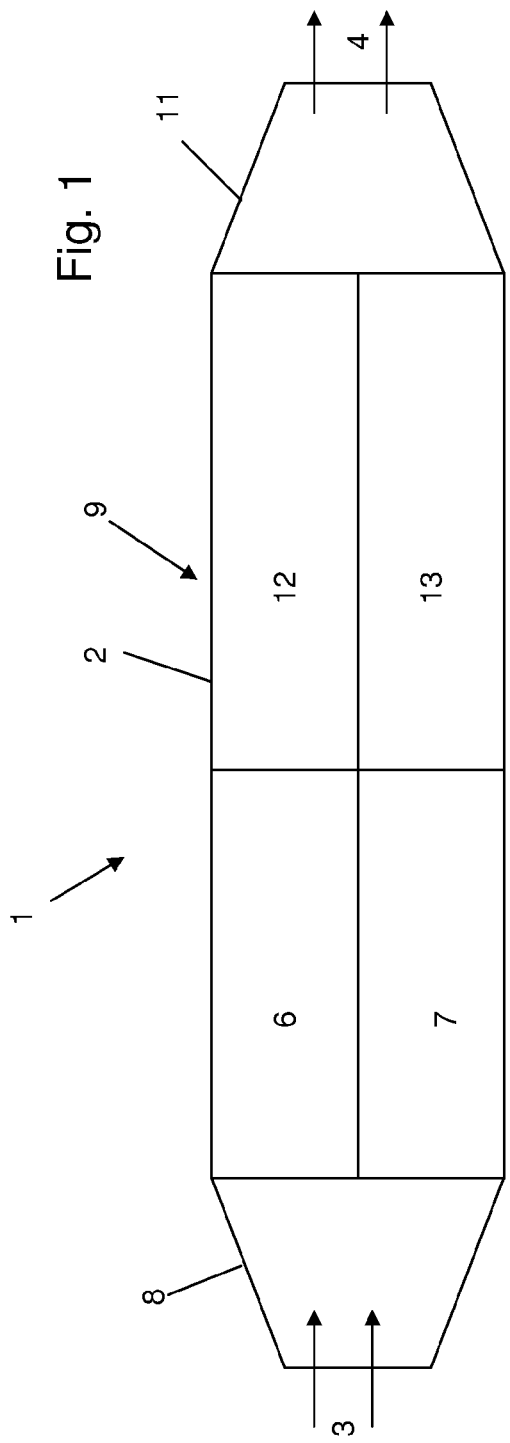
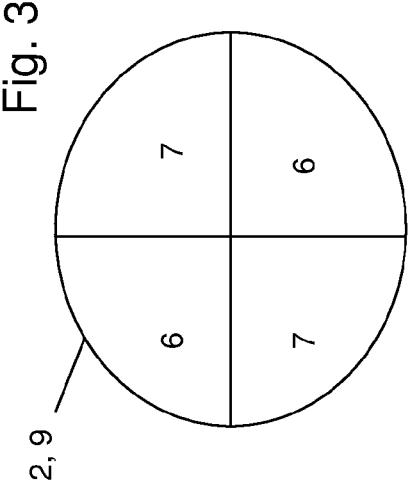
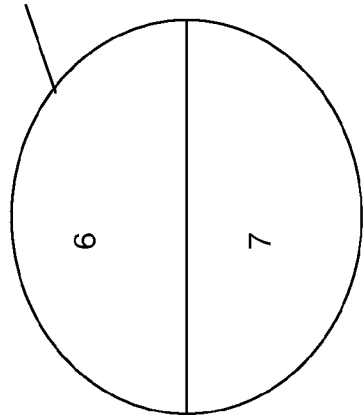

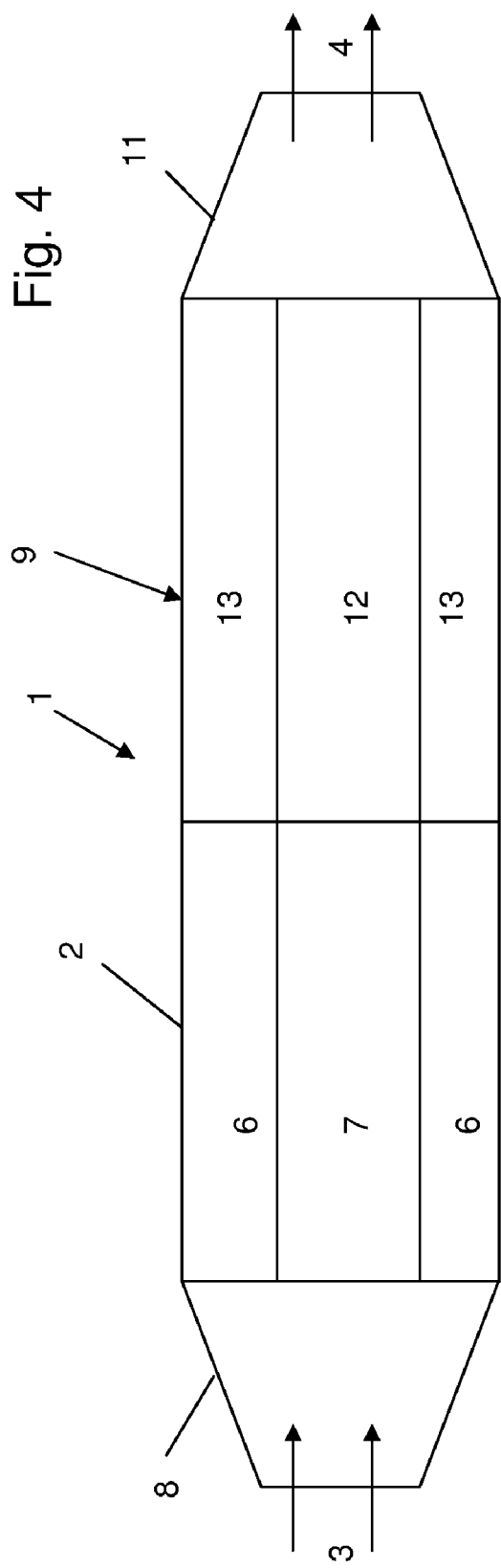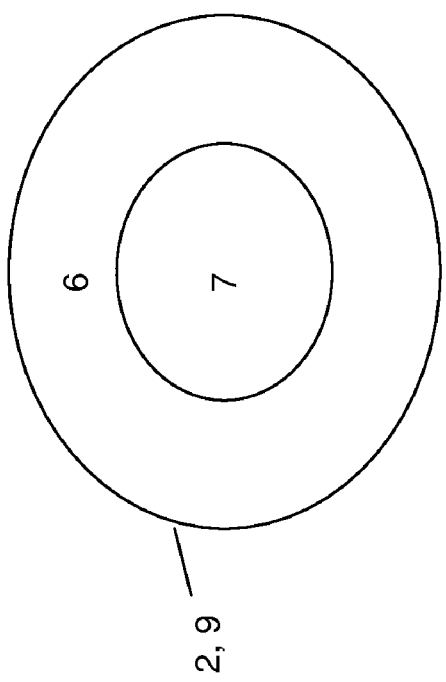

COMBINED EXHAUST GAS AFTERTREATMENT DEVICE

CROSS REFERENCE TO PRIORITY APPLICATION

The present application claims priority to German Patent Application No. 102008042766.7, filed Oct. 13, 2008, titled "Combined exhaust gas aftertreatment device", the entire contents of each of which are incorporated herein by reference.

TECHNICAL FIELD

The description relates to an exhaust gas purification system for exhaust gases from an internal combustion engine, in particular a diesel engine. The exhaust gas purification system is arranged in an exhaust tract which is comprised of a housing that has an inlet and an outlet. In one example, the inlet is connected to an inlet exhaust gas line and the outlet is connected to an outlet exhaust gas line. At least one catalytic converter element and one filter element are arranged in the housing.

BACKGROUND AND SUMMARY

US 2008/0127635 A1 discloses an exhaust gas purification system with a housing, in which are arranged a plurality of air paths which are generated by means of a dividing element. At least one catalytic converter and one particle filter are arranged in the housing. The at least one dividing element is arranged such as to form two chambers lying one above the other which are connected with respect to the exhaust gas inlet, so that the exhaust gas stream is deflected out of one chamber into the other chamber. An exhaust gas purification apparatus of reduced longitudinal extent is thereby to be made available, since the two chambers are arranged so as to lie one above the other. The exhaust gas stream flows through the purification elements arranged in the housing, that is to say one after the other, these being connected virtually in series.

WO2006/021337 A1 is concerned with a catalytically coated particle filter with a first and a second end face and with an axial length. The particle filter, starting from its first end face, is coated on a fraction of its length with a first catalytic converter and thereafter with a second catalytic converter. The first catalytic converter has platinum and palladium on the first carrier material, the second catalytic converter containing platinum and, if appropriate, palladium on second carrier materials. To that extent, the particle filter has two catalytic converter coatings lying in series with respect to the exhaust gas stream. Filters of this type possess a high thermal mass and heat up only slowly, and therefore an increased noble metal concentration is provided in the inlet region of the filter.

WO 2006/021338 A1 discloses a method for coating a wall flow filter. Wall flow filters have two end faces and a multiplicity of flow ducts running parallel to the cylinder axis. To generate the filter action, the flow ducts are closed alternately on the first and the second end face. On its way through the filter, the exhaust gas has to change over from the inlet ducts through the duct walls between the inlet and outlet ducts into the outlet ducts of the filter.

DE 602 22 826 T2 (=partly WO03/068362) discloses a filter for exhaust gas aftertreatment. The filter has a plurality of axially running flow ducts which are closed alternately at least in a second filter portion. The cylindrical filter is a filter roll of folded filter medium which is spiral-wound from a web. In a first through-flow portion, exhaust gas flows, unfiltered, through. The first through-flow portion is a middle inner portion which is surrounded by the second filter portion of ring-shaped design. The middle inner portion is only a through-flow portion with open flow ducts. The filter portion has a catalytic converter portion and a particle filter portion which are arranged in succession. In one embodiment, the exhaust gas stream flows in one part through the filter portion and in another part, unfiltered, through the inner portion. However, because of this, part of the exhaust gases is not purified at all. In order to subject the overall exhaust gas stream to purification, an exhaust pipe is connected to the inner through-flow portion, so that the overall exhaust gas stream flows through the through-flow portion and flows, unfiltered, into a rear chamber. In this, the exhaust gas stream is forced to flow back through the filter portion to the inlet side, where the catalytic converter portion and the filter portion are arranged in succession in a similar way to the version of WO 2006/021338 A1.

In order to treat exhaust gases from an internal combustion engine, in particular a diesel engine, therefore, it is known to arrange a catalytic converter element and a filter element, in particular a particle filter, in an exhaust tract of the internal combustion engine. In this case, the catalytic converter element is arranged either upstream of the particle filter or downstream of the particle filter, and both components can be arranged in one common housing.

If the particle filter is arranged upstream of the catalytic converter element, soot combustion (regeneration) can be carried out more quickly, since sufficient nitrogen oxides are still contained in the exhaust gas stream. The disadvantage, however, because of the high thermal mass of the (diesel) particle filter, is that the temperature in the catalytic converter element rises more slowly, thus leading to reduced nitrogen oxide conversion of the catalytic converter. On the other hand, the catalytic converter or catalytic converter element reaches its operating temperature more quickly if it is arranged upstream of the (diesel) particle filter, thus leading to higher nitrogen oxide conversion. However, because of reduced nitrogen oxide concentrations in the exhaust gas, this leads to reduced soot combustion, in the case of both active and passive regeneration. The two combinations therefore have both advantages and disadvantages.

In one embodiment, the present description improves an exhaust gas purification system such that exhaust gases, and in particular diesel exhaust gases, can be purified more efficiently by combining a catalytic converter element and a filter element with one another in a common housing located in an exhaust system. The housing may be comprised of a central cylinder and a conical inlet and a conical outlet that are attached to the central cylinder.

The present description provides for an exhaust gas purification system having the features of claim 1, the catalytic converter element and the filter element being arranged in the housing such that a first part of the overall exhaust gas stream flows through the catalytic converter element and a second part of the overall exhaust gas stream flows through the filter element. The first part of the exhaust gas flows through a second filter element arranged on the outlet side after passing through the catalytic converter element. The second part of the exhaust gas flows through a second catalytic converter element that is arranged on the outlet side after passing through the first filter element.

By means of the description, therefore, catalytic converters or catalytic converter elements and filter elements are advantageously arranged in the housing such that part of the overall exhaust gas stream, that is to say a first part of the overall exhaust gas stream, is channeled to flow first through the catalyst converter element which is arranged upstream of the following second filter element. The other part of the overall exhaust gas stream, that is to say a second part of the overall exhaust gas stream, is consequently channeled to flow first through the inlet-side filter element which is arranged upstream of the following second catalytic converter element. When the first part of the overall exhaust gas stream flows first through the first catalytic converter element and then through the second filter element, this leads to a high nitrogen oxide conversion, wherein, however, in this case, soot combustion (regeneration) may be less effective on account of the reduced nitrogen oxide concentration in the first part of the exhaust gas stream. However, this condition can be mitigated since the second part of the overall exhaust gas stream flows first through the first filter element. Then, the second part of the overall exhaust gas stream flows through the second catalytic converter element that immediately follows the first filter element. Overall, therefore, at least two filter elements and at least two catalytic converter elements are arranged in the housing and are arranged in each case alternately on the inlet side and outlet side. Advantageously, therefore, an exhaust gas purification system combined with catalytic converter elements and filter elements is made available which utilizes the advantages of the respective series connection and which at least mitigates, or even eliminates, the respective disadvantages.

In an expedient version, the overall exhaust gas stream is divided in the housing such that one half first flows through the filter element and the other half first flows through the catalytic converter or catalytic converter element. It is therefore beneficial in one embodiment for the inlet-side catalytic converter element and the inlet-side filter element to each occupy one half the clear diameter of the housing. Of course, the second catalytic converter element and second filter element, which in each case follow the first catalytic converter and the first filter, are adapted to the configuration of the component which in each case precedes the respective second filter or catalytic converter element.

It is, of course, within the scope of the invention that one of the inlet-side components may be designed to have a larger cross-sectional area and/or total volume than the other element. This allows the overall exhaust gas stream to be divided into individual gas streams that are different than one half of the overall gas flow. For example, the first catalyst may account for 20, 30, 40, 60, 70, or 80 percent of the cross-sectional area in the housing. Then, the filter may occupy the remaining cross-sectional area of the housing. The first catalytic converter may also have a total volume that is less than or greater than the total volume of the first filter element. The second filter element and catalytic converters may also have total volumes that are different than the other. For example, the first catalytic converter may have a volume of 200 $cm^3$ while the first filter has a volume of 250 $cm^3$. The second filter may have a volume of 250 $cm^3$ and the second catalytic converter may have a volume of 200 $cm^3$. It is desirable, however, that the components which in each case follow are adapted to the components which in each case precede. That is, the gas flow that enters the first filter enters the second catalytic converter, and the gas flow that enters the first catalytic converter enters the second filter. To accommodate different volumes of filters and catalysts, an axial extent may also be designed such that the component which in each case follows is designed to be shorter or longer than the component which in each case precedes. To that extent, there could be provision for designing the axial extent of the inlet-side filter element to be longer than that of the inlet-side catalytic converter element, in which case, of course, the following second filter element may be designed to be longer than the second catalytic converter element following the inlet-side filter element.

Advantageously, the two exhaust gas part streams flow through the respective component in parallel from the inlet side to the outlet side, as seen in the main flow direction illustrated in FIG. 1. The inlet side of the housing may be preferably arranged opposite the outlet side, but such a configuration is not necessary.

In a first embodiment, the inlet-side catalytic converter element is arranged above the inlet-side filter element, as referenced in a longitudinal section, the second filter element being arranged alternately above the second catalytic converter element for this purpose.

In a further embodiment, the inlet-side catalytic converter element may be arranged below the inlet-side filter element, as referenced in a longitudinal section, in which case the second filter element may for this purpose be arranged alternately below the second catalytic converter element.

It is possible also to provide more than one filter element and more than one catalytic converter element on the inlet side in the housing. It is conceivable, for example, to arrange on the inlet side two filter elements and two catalytic converter elements which, for example, in each case occupy a quarter of the clear diameter and in each case are arranged obliquely opposite to one another. The respective components are, of course, followed in each case by a corresponding component. To that extent, the term "second catalytic converter element" and "second filter element" means that these follow the inlet-side components, that is to say are arranged downstream, and is not intended to restrict to this number.

In a further embodiment, there may be provision for the inlet-side filter element to be arranged centrally in the housing, as referenced in a longitudinal section, such that the inlet-side catalytic converter element surrounds said filter element virtually in the manner of a casing. The following components are, of course, then arranged such that the second catalytic converter element is arranged centrally and is surrounded by the second filter element.

It is also possible that the inlet-side catalytic converter element is arranged centrally in the housing, as referenced in a longitudinal section, such that the inlet-side filter element surrounds said catalytic converter element virtually in the manner of a casing. The following components are, of course, then arranged such that the second filter element is arranged centrally and is surrounded by the second catalytic converter element.

Expediently, the catalytic converter element may be designed as an SCR catalytic converter (selective catalytic reduction), the filter element being designed as a (diesel) particle filter, which is why the invention is suitable particularly in diesel engines.

BRIEF DESCRIPTION OF THE DRAWINGS

Further advantageous embodiments of the description are disclosed in the dependant and in the following figure description. In the figures:

FIG. 1 shows a longitudinal section through a housing of a combined exhaust gas purification system;

FIG. 2 shows a front cross-sectional view of the exhaust gas purification system from FIG. 1;

FIG. 3 shows a front cross-sectional view of an exhaust gas purification system in a further embodiment;

FIG. 4 shows a longitudinal section through a housing of a combined exhaust gas purification system in a third embodiment; and FIG. 5 shows a front cross-sectional view of the exhaust gas purification system from FIG. 4.

DETAILED DESCRIPTION

FIG. 1 shows an exhaust gas purification system 1 for exhaust gases flowing from cylinders of an internal combustion engine, in particular a diesel engine, which is arranged in an exhaust tract and has a housing 2 with an inlet 3 and an outlet 4. The inlet 3 is shown connected to an inlet line and the central cylindrical body of housing 2. The outlet 4 is shown connected to an outlet line and the cylindrical body of housing 2. At least one catalytic converter element 6 and one filter element 7 are shown arranged in the housing 2.

The catalytic converter element is designated below as a catalytic converter and the filter element as a filter.

The inlet line and the outlet line are not illustrated in FIG. 1. The inlet line can be connected on the inlet side to a conically widening transitional portion 8 of the housing 2, which transitional portion merges into a treatment portion 9 of the housing 2, said treatment portion being designed, for example, cylindrically, as seen in longitudinal section. Connected to the treatment portion 9 on the outlet side is a conically tapering transitional portion 11 which is connected to the outlet line, not illustrated. Thus for example, conical portions 8 and 11 are connected to the ends of cylinder 9 as shown if FIG. 1. An overall exhaust gas stream from the internal combustion engine, in particular the diesel engine, flows through the inlet line to the housing 2. FIG. 1 shows by way of example a housing 2 designed cylindrically, as seen in cross section (FIG. 2). The housing 2 may, of course, also have other geometrically designed shapes, as seen in cross section, for example, oval or race track.

The catalytic converter 6 and filter 7 are arranged or positioned in the housing 2 such that a first part of the overall exhaust gas stream flows through the catalytic converter 6 and a second part of the exhaust gas flows through the filter 7. The first part of the exhaust gas also flows through a second filter 12 arranged or positioned on the outlet side after passing through the catalytic converter 6. The second part of the exhaust gas also flows through a second catalytic converter 13 arranged on the outlet side after passing through the first filter 7 (e.g., particulate filter). In this way, the first filter is placed in series with the second catalytic converter, and the first catalytic converter is placed in series with the second filter. As a result, the first filter and the first catalyst are in direct communication with the inlet. Thus, two separate and segregated exhaust gas flow paths are created in the housing. In one embodiment, the outlet 11 is in communication with the atmosphere by way of an outlet pipe.

For example, a first part of the overall exhaust gas stream first flows through the inlet-side catalytic converter 6, which is preferably designed as an SCR catalytic converter, and then flows through the filter 12 which directly follows the latter and is preferably designed as a diesel particle filter. This arrangement leads to a rapid attainment of the operating temperature of the catalytic converter 6 and therefore to a reduction in nitrogen oxides in the first part of the overall exhaust gas stream. However, since the first part of the overall exhaust gas stream thereby has a reduced nitrogen oxide content, this leads to a less efficient soot combustion in the diesel particle filter, in the case of both active and passive regeneration.

The abovementioned condition may be mitigated, or even eliminated, by means of the description, in that the second part of the overall exhaust gas stream flows first through the filter 7 arranged on the inlet side and likewise designed as a diesel particle filter, in order then to flow through the directly following second catalytic converter 13. The second part of the overall exhaust gas stream consequently has a nitrogen oxide fraction such that soot combustion (regeneration) may be achieved more quickly.

In one embodiment, the first catalytic converter and the first filter are substantially geometrically equivalent. Further, the first filter and second catalytic converter may be geometrically equivalent to the first catalytic converter and the second filter. Further still, the cross-sectional area of the first filter element and the first catalyst may be substantially equivalent (e.g., within $\pm 10$ cm$^2$ of each other). In addition, the cross-sectional area of the second filter and the second catalytic converter may be substantially equivalent.

By means of the description, therefore, the benefits of the series-connected filters 7 (catalytic converter 6) and catalytic converters 13 (filter 12) are advantageously combined with one another, in order thereby to achieve a better purification of exhaust gases, in particular of diesel exhaust gases. In this case, account is taken of the fact that both series connections are different, but these differences can be used as an advantage by combining the two series connections in one common housing 2.

As may be gathered from FIG. 1, the overall exhaust gas stream may be divided into substantially two halves, and therefore the respective components (filter 7, 12 and catalytic converter 6, 13) and their geometric extent in both the radial (cross-sectional area) and in the axial direction may be designed identically.

FIG. 2 shows a front view of the inlet side of the housing 2 in cross section, in which, of course, only the in each case inlet-side filter 7 and catalytic converter 6 can also be seen.

It is, of course, within the scope of the description to provide more than one catalytic converter 6 and one filter 7 in each case on the inlet side and therefore also on the outlet side, as shown, for example, in FIG. 3. In FIG. 3, for example, two filters 7 and two catalytic converters 6 are arranged on the inlet side and are designed such that the clear diameter of the treatment portion 9 is filled by the components, each component occupying a quarter of the clear diameter and being arranged obliquely opposite to one another. In this case, the overall exhaust gas stream is divided into four part flows which, in turn, flow, oriented in parallel (with respect to the main flow direction from the inlet side to the outlet side), through the components. The part flows are not illustrated in the individual figures.

On the outlet side, the respective filter 7 is then followed by the second catalytic converter 13 and the respective catalytic converter 6 by the second filter 12, although this cannot be seen in FIG. 3 because of the view illustrated, two filters 12 and two catalytic converters 13 being arranged, of course, on the outlet side.

A further embodiment is shown in FIGS. 4 and 5. In FIG. 4, the filter 7 is arranged centrally in the housing 2 and is surrounded by the inlet-side catalytic converter 6 virtually in the manner of a casing. On the outlet side, the filter 7 is followed, in turn, by the second catalytic converter 13, the second filter 12 following the inlet-side catalytic converter 6. The components may again be selected in terms of their configuration such that the components are connected in series in each case and may be identical in their geometric extent.

Of course, the individual components may be designed differently in their geometric extent, in particular in their longitudinal extent. Thus, the inlet-side filter 7 may be longer than the inlet-side catalytic converter 6, as a result of which, of course, correspondingly different axial lengths of the components which in each case follow may be obtained.

This concludes the description. The reading of it by those skilled in the art would bring to mind many alterations and modifications without departing from the spirit and the scope of the description. For example, I3, I4, I5, V6, V8, V10, V12, and turbine engines operating on non-limiting fuel types such as ethanol, kerosene, jet fuel, gasoline, propane, proponol, diesel, or other alternative fuel configurations could use the present description to advantage.

The invention claimed is:

1. A system for purifying exhaust gases of an engine, comprising:
   a housing with an inlet and an outlet, the inlet in communication with at least one engine cylinder, the outlet in communication with an atmosphere;
   a first catalytic converter element and a first filter element arranged in the housing such that a first portion of exhaust gases that flow from the at least one engine cylinder flow to the inlet and flow through the first catalytic converter element, and a second portion of exhaust gases flow from the at least one engine cylinder flow to the inlet and flow through the first filter element; and
   a second catalytic converter element and a second filter element, the second catalytic converter element positioned so that exhaust gases flowing through the first filter element flow through the second catalytic converter element, the second filter element positioned so that exhaust gases flowing through the first catalytic converter element flow through the second filter element, wherein the first catalytic converter element is connected in series with the second filter element, and the first filter element is connected in series with the second catalytic converter element, such that two separate and segregated flow paths are created in the housing, and wherein the first catalytic converter element and second catalytic converter element are SCR type catalytic converters and wherein the first filter element and second filter element are designed as diesel particle filters.

2. The system of claim 1 wherein the first catalytic converter element and the second filter element are geometrically substantially equivalent to the first filter element and the second catalytic converter element.

3. The system of claim 1 wherein a cross-sectional area of the first filter element and the first catalytic converter element are substantially equivalent.

4. The system of claim 3 wherein a cross-sectional area of the second filter element and the second catalytic converter element are substantially equivalent.

5. The system of claim 1 wherein the first filter element is arranged centrally in the housing and is surrounded by the first catalytic converter element, and the second filter element is surrounded by the second catalytic converter element.

6. The system of claim 1 wherein the first catalytic converter element is arranged centrally in the housing and is surrounded by the first filter element, and the second catalytic converter element is surrounded by the second filter element.

7. An engine exhaust gas purification system, comprising:
   a housing with an inlet and an outlet;
   a first SCR-catalyst and a first filter element arranged in the housing such that the first catalyst and the first filter element are in direct communication with the inlet; and
   a second SCR-catalyst and a second filter element, the second SCR-catalyst positioned in series with the first filter element, the second filter element positioned in series with the first SCR-catalyst.

8. The system of claim 7 wherein the first filter element and second filter element are diesel particulate filters.

9. The system of claim 7 wherein the housing is comprised of a central cylinder and a conical inlet and a conical outlet, the inlet and outlet being attached to the central cylinder.

10. The system of claim 7 wherein the first filter element and the first SCR-catalyst are different volumes.

* * * * *